United States Patent [19]

Kazan

[11] Patent Number: 4,660,938

[45] Date of Patent: Apr. 28, 1987

[54] OPTICAL DISPLAY DEVICE

[75] Inventor: Benjamin Kazan, Los Altos, Calif.

[73] Assignee: Xerox Corporation, Stamford, Conn.

[21] Appl. No.: 710,734

[22] Filed: Mar. 11, 1985

[51] Int. Cl.⁴ .......................... G02F 1/01; G02F 1/00; G02B 26/00; G02B 27/00

[52] U.S. Cl. .................................. 350/355; 350/163; 350/359; 350/360

[58] Field of Search ................ 350/163, 355, 359, 360

[56] References Cited

U.S. PATENT DOCUMENTS

| | | | |
|---|---|---|---|
| 3,572,896 | 3/1971 | Bertram | 350/160 |
| 3,909,116 | 9/1975 | Kohashi | 350/267 |
| 4,030,813 | 6/1977 | Kohashi et al. | 350/355 |
| 4,569,575 | 2/1986 | Le Pesant et al. | 350/355 |

FOREIGN PATENT DOCUMENTS 55-69126  5/1980  Japan .

OTHER PUBLICATIONS

"ZOD Micro–Images: Colour and Black–and–White Image Reproduction from Surface Relief Grating Structures", K. Knop and M. T. Gale, The Journal of Photographic Science, vol. 26, 1978, pp. 120–122.

"Electro–Wetting Displays", G. Beni and S. Hackwood, Applied Physics Letters 38(4), Feb. 15, 1981, pp. 207–209.

Primary Examiner—Bruce Y. Arnold
Assistant Examiner—D. Edmondson
Attorney, Agent, or Firm—W. Douglas Carothers, Jr.

[57] ABSTRACT

A transparent electrode has a grating formed thereon, the dimensions of the grating selected to prevent light transmission at a given wavelength or range of wavelengths. A non-wetting transparent liquid covering the grating is held in place by a second electrode. Application of an electrical field between the electrodes causes the liquid to be drawn into the space between the grating ridges, allowing light transmission.

4 Claims, 7 Drawing Figures

OPTICAL DISPLAY DEVICE

BRIEF SUMMARY OF THE INVENTION

A display is described which operates as a light-valve over selected ranges of wavelengths. A fine grating is formed on a transparent electrode, the depth of the grooves being such that the optical path length of light of a given wavelength passing through the spaces between the individual grates differs by an odd number of half wavelengths from the optical path length of light of the same wavelength passing through the individual grates. The resulting phase difference between the adjacent light rays passing through the two regions causes cancellation so that no net light is transmitted. The grating is covered with a non-wetting, transparent liquid having a surface tension sufficient to prevent the liquid from filling the spaces between the grates. The liquid is backed with a second electrode which may be transparent or reflective. The second electrode is made transparent if it is desired to have a display which operates by transmitted light. The second electrode is made reflective if it is desired to have a display which will operate by refelected light. Application of a voltage between the two electrodes produces an electric field which draws some of the liquid into the space between the grates, thus altering the optical path length of light traversing these spaces. Since the initial difference in optical path length between light passing through the grates and the space between them is changed, cancellation of adjacent light rays no longer exists, and some light will pass through the grating structure. By providing an array of electrodes for addressing individual areas, an image display can be provided.

The invention will be better understood upon reading the detailed description, and particularly when the detailed description is considered in conjunction with the drawing which shows two preferred embodiments of the invention.

BRIEF DESCRIPTION OF THE DRAWING

In the various Figures, similar parts are given similar numerical designations. The Figures are not drawn to scale.

DESCRIPTION OF THE PREFERRED EMBODIMENTS

Figure 1A:
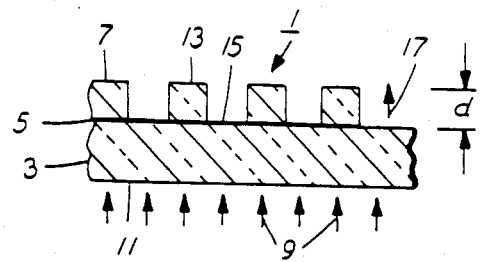
FIG. 1A shows a sectional side view of a cell of a grating structure which will block the transmission of light.

Referring now to FIG. 1A, there is shown a grated light-blocking structure designated generally as 1, which, in this exemplary instance, is made up of transparent substrate 3 having formed thereon a transparent electrode 5. Formed on transparent electrode 5 are transparent longitudinal grates 7 made of an insulating material of depth "d". Transparent longitudinal grates 7 run the length of the display device and are approximately rectangular in cross section. A source of radiation of substantially a single or limited range of wavelengths (not shown) is used to expose the grated light-blocking structure 1 to input illumination 9. For light passing through the longitudinal grates 7, the optical path length is determined by the product of the distance from the top of electrode 5 to grate surface 13 and the index of refraction of the material. In the gap between individual longitudinal grates 7, light traveling the same distance has a reduced optical path length because of the lower index of refraction of this space. In order for grated light-blocking structure 1 to suppress the transmission of input illumination 9, the difference in optical path lengths mentioned above must equal approximately an odd number of half wavelengths of the input illumination. This effect is described in "ZOD Micro-Images: Colour and Black-and-White Image Reproduction from Surface Relief Grating Structures" by K. Knop et al, Journal of Photographic Science, Vol. 26, 1978, pages 120–123. By comparison, in areas of the substrate 3, some distance away from the grating structure where no grates are provided, light is transmitted resulting in output light 17.

Figure 1B:
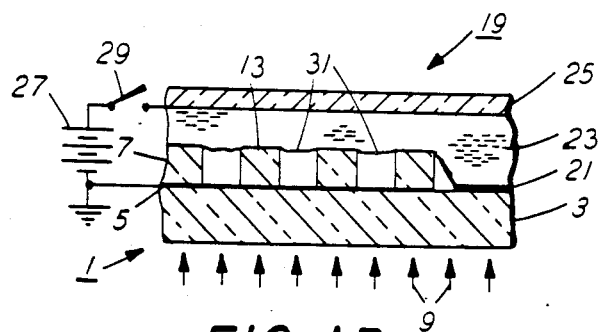
FIG. 1B shows the light-blocking grated structure of FIG. 1A as used in a transmitted light display device in accordance with this invention with no electrical potential applied between the electrodes.

Referring now to FIG. 1B, there is shown a side sectional view of a cell of a display device shown generally as 19, which cell utilizes the grated light-blocking structure 1 as shown in FIG. 1A. Display device 19 has formed on transparent substrate 3 transparent electrode 5. Formed on transparent electrode 5 are transparent longitudinal grates 7. A second transparent conductive electrode 25 is provided in spaced relationship to the first transparent conductive electrode 5. Suitable insulating spacers (not shown) are provided to keep the electrodes parallel and to provide containment for transparent liquid 23, which may be insulating or conductive. Sufficient transparent liquid 23 is provided to cover the transparent longitudinal grates 7 and fill the gap between opaque insulating layer 21 and transparent conductive electrode 25. A source of DC potential difference 27 is connected through switch 29 to transparent conductive electrode 25 and to a common ground with transparent conductive electrode 5. Since the transparent liquid is selected to be non-wetting in relation to transparent longitudinal grates 7, the liquid meniscus 31 forms substantially in the plane formed by grate surfaces 13. In areas where grates 7 are not provided, the liquid will fill the gap between the transparent conductive electrodes 5, 25 as discussed above. The display device 19 is exposed to uniform input illumination 9.

In operation, since the grated light-blocking structure 1 has been designed to prohibit transmission of the input illumination 9, and since opaque insulating layer 21 is provided in the non-grated areas, no illumination is transmitted. The observer viewing the display device 19 from the transparent electrode 25 side will not see transmitted light.

Figure 1C:
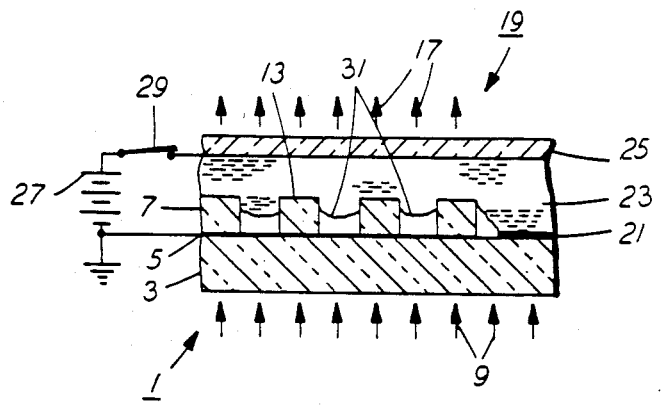
FIG. 1C shows the light-blocking grated structure of FIG. 1A used in a display with electrical potential applied between the electrodes to allow light transmission.

Referring now to FIG. 1C, switch 29 is closed, which applies an electrical potential difference across transparent liquid 23 between transparent conductive electrodes 5, 25. Upon application of electrical field, transparent liquid 23 is drawn into the spaces between grates 7. The optical path length for the input illumination 9 in the spaces changes since input illumination 9 now also traverses the liquid in the space between the grates 7. As the optical path length difference deviates from an odd number of half wavelengths of the input illumination 9, the grated light-blocking structure 1 no longer suppresses light transmission. An observer viewing the display device 19 from the transparent conductive electrode 25 side will see output radiation 17 corresponding to the area over which electrical potential is applied.

Figure 2A:
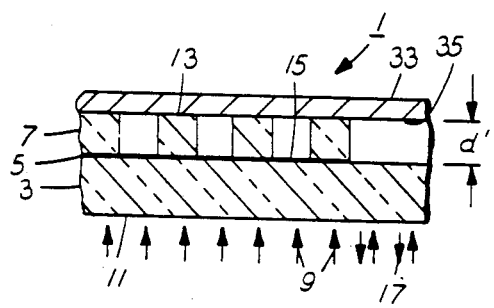
FIG. 2A shows a side sectional view of a grating structure and reflector, the combination designed to initially block reflected light.

Referring now to FIG. 2A, the same principle of operation as described above may be utilized to provide a display device 19 based on reflected light. In this case, a conductive electrode 33 is supplied, which has a reflecting surface 35 facing the input illumination 9. In this case, however, the depth "d" of the grating structure is made so that an odd number of quarter wavelengths of the input illumination 9 results. Since the input illumination 9 traverses the grated light-blocking structure 1 twice, this results in cancellation of the reflected light. As can be seen, where transparent longitudinal grates 7 are absent, input illumination is reflected from reflecting surface 35 and exits as output illumination 17.

Figure 2B:
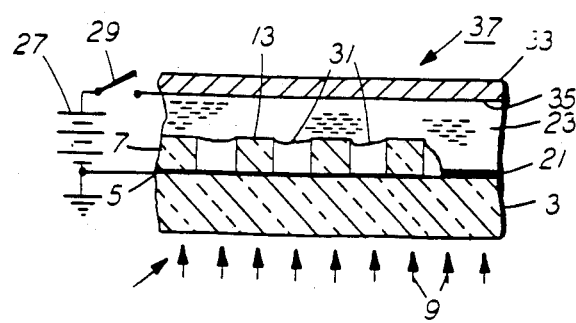
FIG. 2B shows the structure of FIG. 2A as it is used in a display device with no electrical potential applied.

Referring now to FIG. 2B, the grated light-blocking structure 1 of FIG. 2A is used in a display device 37, which is based on the control of reflected light as contrasted to the transmitted light display device 19 as shown in FIGS. 1A-C. Here, however, with no electrical potential applied, the observer viewing the display from the transparent substrate 3 side will not see light emission. The area 21 outside of the grate area should be black or non-reflecting.

Figure 2C:
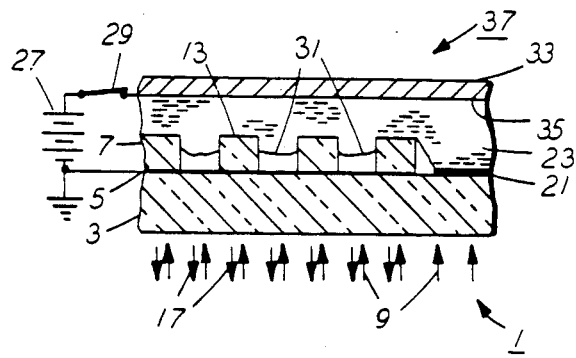
FIG. 2C shows the structure of FIG. 2A as it is used in a display device with electrical potential applied to form an image by reflectance.

Referring to FIG. 2C, in operation, when electrical potential is applied by closing switch 29, the transparent liquid 23 is drawn into the spaces between the grates 7 altering the optical path wavelength difference sufficiently to allow the emission of output illumination 17. Output illumination 17 can be viewed directly.

Figure 3:
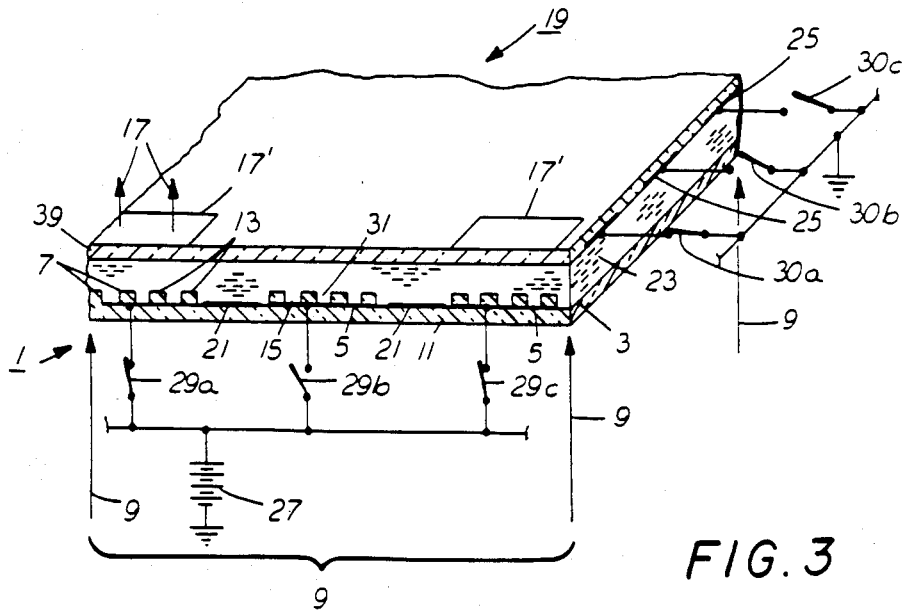
FIG. 3 shows a perspective view of a section of a display device incorporating an electrode matrix.

Referring now to FIG. 3, there is shown a display device 19 incorporating an array of cells of the type shown in FIGS. 1A-1C. Here, each cell is shown, for example, to contain four transparent longitudinal grates 7, which, combined with transparent substrate 3, form a light-blocking grated structure 1. Transparent liquid 23 is held in display device 19 by transparent insulating member 39, which has formed in or on its inner surface a series of transparent electrode strips 25, which traverse the width of the display device 19 and spacers (not shown). Each transparent electrode strip 25 is provided with a separate switch, 30a-c. Also switches 29a-c are provided for electrode strips 5 so that selective cells may be turned on or off as desired. In operation, display device 19 is uniformly illuminated by input illumination 9. To activate desired elements, control means (not shown) open or close predetermined switches. As shown in FIG. 3, switches 29a and 29c are closed as well as switch 30a, allowing the full potential $V_1+V_2$ to be applied across selected elements. The grated light-blocking structure associated with each of these elements then becomes light transmitting because of meniscus movement as explained in connection with FIG. 1C. Since, in this exemplary instance, for purposes of explanation, the transparent electrode strips 5 are assumed to extend the length of display device 19, and electrode strips 25 run the width of display device 19, the output light 17 would emanate from display device 19 in areas shown by rectangles 17'. In a similar manner, by closing switch 30b (leaving open switches 30a and 30c) and closing selected switches of the group 29a-c, selected elements of the next row may be made transmitting. To produce an image, the device would be rapidly addressed in a line-by-line manner as indicated above.

As an alternative, display device 19 could be based on the light-blocking structures shown in FIGS. 2A-2C. In this case, the upper member 39 would have a reflective surface facing the input illumination 9, and the display device 19 would operate so that it is viewed from the transparent substrate 3 side as explained in connection with the discussion of FIG. 2C.

In a further embodiment of the reflective display device 37, the liquid 23 could be reflective and conductive, consisting, for example, of mercury. In this case, the liquid 23 could serve as one electrode of the system, and a potential difference could be applied between transparent conductive electrode 5 and the conductive liquid 23. If conductive liquid is used, partitions would have to be added to form electrically separated conducting strips (replacing electrodes 30a-c of FIG. 3).

As an example of a light transmitting structure, the surface of a glass substrate coated with conductive indium-tin-oxide is etched to provide electrode strips 5 approximately 250 μm wide. A grate 7 structure may be formed on the electrode strips 5 by embossing grooves into an insulating layer about 1000 Ångstroms thick. Alternatively, the grooves of the grating 7 may be made by depositing a uniform layer of photoresist and optically exposing it, then removing unexposed material. The space between the electrodes may be coated with a thin layer of metal evaporated through a mask to expose the desired areas. This metal may then be overcoated with a thin layer of insulator to provide electrical isolation. A second conductively coated glass plate is placed over the liquid, conductive surface down. In operation, the display device thus formed may be exposed to uniform visible radiation having a bandwidth of 100 nm or less. As mentioned above, this radiation is chosen in accordance with the depth of the grooves selected so that no light is transmitted in the absence of voltage applied. Upon application of about 10 volts DC electrical potential between the conductive surfaces, sufficient fluid will be drawn into the grooves to cause light transmission. A light-blocking substrate for a reflective display is made as above except that the grating depth should be about half that of those of the light transmitting case. The same liquid may be used. The upper conductively coated glass plate is replaced with a plain glass plate having a conductive reflective surface. Application of potential between the conductive reflective surface and the conductive surface below causes light to be reflected from the display device.

A reflecting display device is made as above except that the insulating liquid is replaced with mercury. Here again, potential application causes an increase in reflected light. In all embodiments, the grooved insulator may be relatively thick. It is only necessary that the depth of the grooves produce a half-wave phase delay in the light or a quarter-wave delay for reflecting devices. With rectangular grooves, light with a relatively narrow band (i.e., of a single color) must be used. However, if the grooves are made sinusoidal as in FIG. 4 of the paper by K. Knop et al referred to above, white light with a broad spectrum may be used.

Although specific components and materials have been enumerated above, other components and materials where suitable may be used. Such modifications should be considered as encompassed by the following claims.

What is claimed is:

1. A light-modulating cell comprising an electrically insulating transparent layer with a light-interference-producing grating surface, a non-wetting fluid in contact with said grating surface, and at least two electrodes positioned to apply a potential difference across said grating surface and said liquid so as to alter said cell, for a given wavelength of light, from being light-blocking to being light-transmissive or from being non-reflective to being reflective.

2. The light-modulating cell of claim 1 wherein the liquid is conductive and acts as one electrode in the system.

3. A method of imaging which comprises:
providing a layer of a non-wetting liquid on a grated structure having spaced apart grates, which structure, in the absence of an electrical potential across said liquid, blocks light of a given wavelength; and
applying an electrical potential across said liquid to cause said liquid to enter the spaces between said grates sufficiently to cause said light to be transmitted through said structure.

4. The method of claim 3 wherein the liquid is conductive, and the liquid is made an electrode in the system.

* * * * *